Patented Sept. 18, 1934

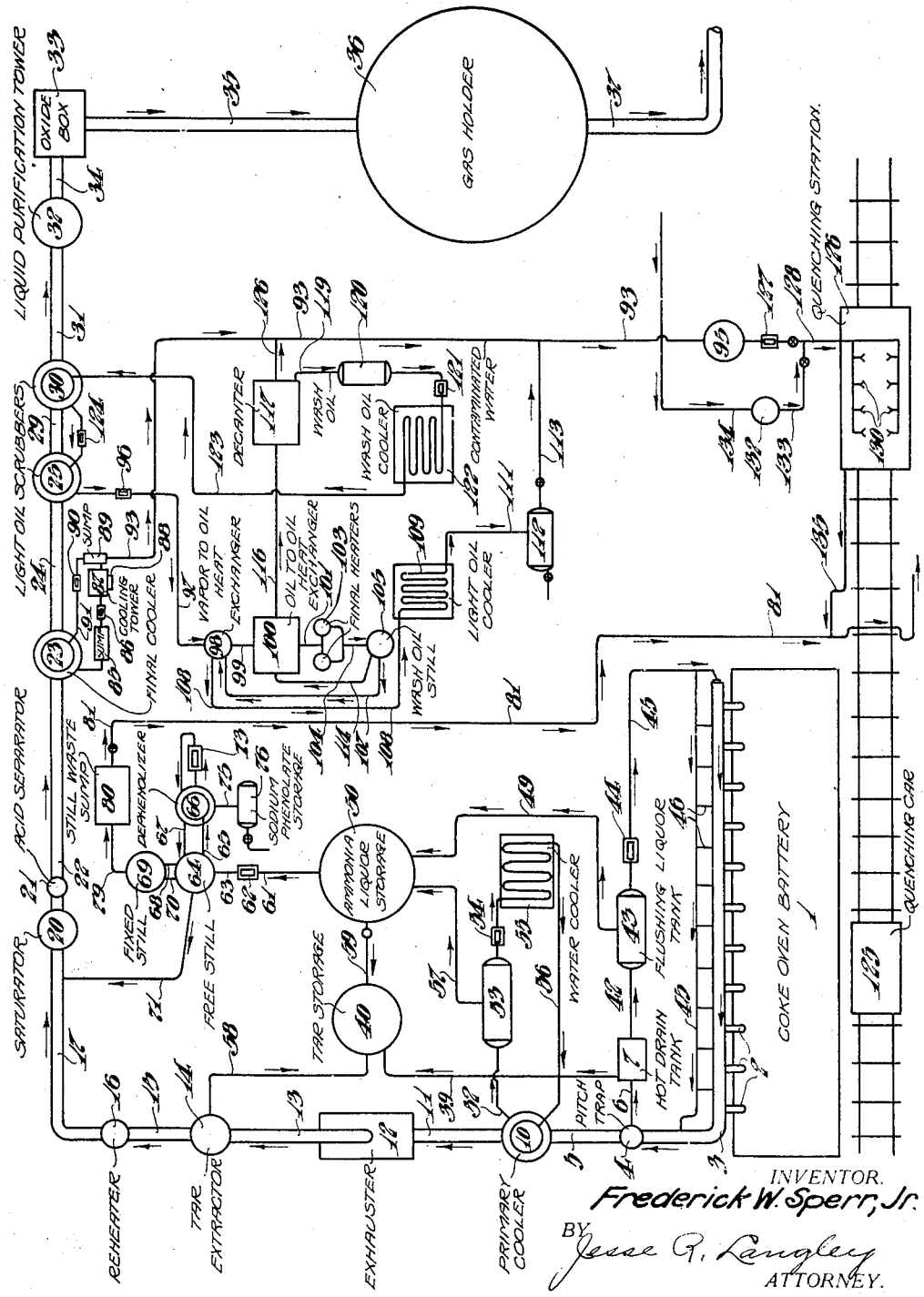

1,973,913

UNITED STATES PATENT OFFICE 1,973,913

PROCESS OF QUENCHING HOT COKE

Frederick W. Sperr, Jr., Pittsburgh, Pa., assignor to The Koppers Company of Delaware, a corporation of Delaware Application August 26, 1930, Serial No. 477,809

2 Claims. (Cl. 202—37)

My invention relates to the disposal of phenol-containing waste waters from coal-carbonizing plants, especially from coke-oven plants.

In the carbonization of coal, certain phenolic compounds are liberated which pass out of the distilling chambers in the hot gas and are subsequently collected at various points during the purification of the gas prior to its distribution. These compounds are commonly known as phenols or tar acids.

In normal coke-plant operation, the major portion of the tar acid is generally removed from the raw gas with the tar which is separated from the gas in the hydraulic main, the primary cooler, the tar extractors, etc. Some of the tar acid, however, generally remains in the gas even after passing the tar extractors.

In the primary cooler and in the hydraulic main, tar is condensed from the gas in contact with a liquor, which generally also contains ammonia. This liquor is thereafter removed and distilled for the recovery of ammonia. As tar acids are soluble in ammonia liquor, part of the tar-acid content of the tar passes into the liquor. The amount of tar acids dissolved by ammonia liquor from tar with which the liquor comes in contact varies, and depends on such factors as initial tar acid content of the tar, temperature, etc. Under normal conditions, it frequently amounts to the equivalent of about two grams or more of phenol per liter of the liquor.

When this liquor is distilled for the recovery of ammonia, a portion of the tar acid is returned to the gas stream with the still vapors, and the remainder passes through the still and is discharged in the still waste, which then has to be disposed of.

Most of the tar acids remaining in the gas after passing the saturator are removed in the final cooler and/or with the light oil when the gas is scrubbed for benzol recovery. Tar acids contained in the light oil get into the decanter water, which thus becomes a phenol containing waste water, and the final cooler water presents another disposal problem.

Thus, coke plant waste waters containing tar acids are chiefly of three kinds: namely, ammonia still waste, contaminated water from benzol plants, and effluent from final coolers.

In the past, a common method of disposing of these phenol-containing waste waters has been to evaporate them, as their discharge into streams has been prohibited by regulations forbidding stream pollution. Since the apparatus required for direct evaporation, and the heat thereby consumed, are both so expensive as to make this practice uneconomical, evaporation has frequently been accomplished by using the contaminated water to quench coke.

However, there are also several disadvantages to that method of disposal. Quenching with these polluted wastes causes rapid depreciation of the quenching equipment, because the calcium chloride contained in the still waste is very corrosive. Also, it is necessary to provide sumps to catch the excess water used in quenching so that it can be reused, which entails an expensive installation and the possibility of trouble due to coke breeze getting into the sumps and causing undue wear of the pumps and piping. Further, coke completely quenched with these wastes is often discolored and has a disagreeable odor which makes it undesirable for domestic use.

The primary object of my invention is to provide an economical method for disposing of all phenol-containing waste waters from coal-carbonizing plants, in such manner that no phenolic compounds are discharged to cause stream pollution troubles nor is the coke subjected to any deteriorating treatment.

This disposal is accomplished according to my invention in steps, first removing tar acid from the ammonia liquor before its discharge as still waste and preferably before the addition of lime to the liquor for the purpose of liberating ammonia which, as is well known to those skilled in the art to which this invention appertains, is present in the gas liquor as fixed compounds, such as ammonium chloride; next, I recirculate the final cooler water and discharge any excess, such as may be formed by condensation from the gas in cold weather, to a polluted water storage reservoir. The contaminated waste water is also discharged from the benzol recovery plant to the polluted water storage reservoir. Then coke is partially quenched with the polluted waste water from this reservoir, the waste so used being completely evaporated, and the quenching is completed with ordinary water.

The still waste obtained is substantially free from tar acids, and consequently can be discharged with other unpolluted plant wastes and need not be evaporated. The surplus quenching water is also unpolluted, and can be discharged as desired.

My invention thus accomplishes its second object, which is to decrease the deterioration suffered by quenching station equipment when contaminated plant waste liquors are evaporated by spraying them on hot coke.

My invention has for further objects such other operative advantages and results as are found to obtain in the process hereinafter described and claimed.

With these and other objects in view, I now describe with reference to the accompanying drawing a preferred method by which my invention may be practiced. In the drawing, The single figure is a diagrammatic plan and flow sheet illustrating how my improved process of gas manufacture and waste disposal may be operated according to my invention.

Gas produced in the ovens which make up the coke-oven battery 1 passes through ascension pipes 2 into an hydraulic main 3, through which it passes to a pitch trap 4. Passing from an outlet near the upper end of the trap 4, the gas is drawn through a main 5, a primary cooler 10 and a main 11 by an exhauster 12, which delivers the gas through a main 13, a tar extractor 14, a pipe 15, a reheater 16 and a pipe 17 to an ammonium sulphate saturator 20.

The gas passes from the saturator through an acid separator 21 and a pipe 22 to a final cooler 23, then through a pipe 24 to a benzol or light-oil scrubber 25. From this scrubber, the gas passes through a pipe 29, another light oil scrubber 30, and a pipe 31 to the $H_2S$ removal apparatus, which may consist of a liquid purification plant 32 and catch boxes 33 connected by a pipe 34.

The purified gas then passes through a pipe 35 into a storage holder 36, from which it is withdrawn as desired through a pipe 37.

In the hydraulic main 3, the raw gas is partially cooled by contact with liquor which is withdrawn from a flushing liquor circulating tank 43 by a pump 44 and delivered through a pipe 45 and various connecting pipes 46, which may terminate in sprays, into the interior of the main 3. The cooling condenses a substantial portion of the tar, as well as portions of the other constituents of the gas, such as fixed ammonia.

The circulated liquor and condensate flow with the gas into the pitch trap 4, where they are separated from the gas and pass from the lower end of the trap 4 through a pipe 6 into a hot drain tank 7.

In the hot drain tank 7, the tar and pitch are at least partially separated from the aqueous liquor, and are discharged through a pipe 39 to a tar-storage tank 40. The liquor, usually containing ammonia and some tar acids and other tarry matter in solution and/or in suspension, flows through a pipe 42 to the flushing liquor tank 43, from which it is recirculated by the pump 44 as described. Surplus liquor flows through a pipe 49 to an ammonia liquor-storage tank 50.

In the primary cooler 10, the gas receives further cooling, and further portions of tar, water and ammonia are condensed. In the present instance, direct cooling is used, and the cooling liquor and condensate flow together from the bottom of the cooler 10 through a pipe 52 into a cooling water tank or reservoir 53. From the tank 53, cooling water is withdrawn by a pump 54 and delivered through a water cooler 55 and a pipe 56 back to the cooler 10, wherein a further quantity of gas is cooled. Surplus liquor, approximately equal in volume to the condensate, flows from tank 53 through line 57 to the ammonia liquor storage tank 50.

After passing through the tar extractor 14, the gas is substantially free from tar, and is then reheated by the heater 16 and passed through the saturator 20, wherein ammonia is removed by the sulphuric acid through which the gas is bubbled. Tar removed from the gas in the extractor 14 passes through a pipe 58 to the tar-storage tank 40.

Most of the liquor entering the ammonia liquor storage tank 50 contains a certain amount of tarry matter condensed from the gas in the hydraulic main, the primary cooler, etc. A considerable portion of this material settles to the bottom of the tank 50 and is withdrawn through a pipe 59 to the tar tank 40. However, some of the lighter constituents of the tar, especially the tar acids, remain dissolved in the liquor to a certain extent, as stated hereinabove.

The ammonia liquor, containing both free and fixed ammonia, such as, for instance, ammonium chloride, as well as tar acid and other impurities, is withdrawn from the tank 50 through a pipe 61 by a pump 62 and delivered through a pipe 63 to a free ammonia still 64. In this still 64, the ammonia liquor is treated with steam and/or other hot vapors, which remove free ammonia and usually a portion of the other volatile constituents such as carbon dioxide, tar acids, hydrogen sulphide, etc., which pass out of the still 64 to the gas main 17.

The liquor from which the free ammonia has been removed is withdrawn from the lower part of the free still 64 through a pipe 65 to a dephenolizer 66 wherein tar acids are removed, and is then returned through a pipe 67 at least substantially free from tar acids to a mixing chamber which may conveniently be located below the free still 64.

In this mixing chamber, lime or other alkaline material is added to the dephenolized liquor to liberate fixed ammonia, and the liquor then flows through a pipe 68 to the fixed ammonia still 69, where it is distilled with steam. The steam, bearing ammonia removed from the liquor, passes from the top of the still 69 through a pipe 70 into the lower part of the free still 64, then continues upwardly through the free still 64 and removes free ammonia and other constituents from the liquor as described hereinabove.

The vapor, including ammonia and such other constituents as may have been removed from the liquor in the stills 64 and 69, passes from the top of the still 64 through a pipe 71 into the gas main 17 at a point near the saturator 20, and passes with the gas into the saturator.

The still waste, i. e., the liquor from which ammonia has been removed, is discharged from the fixed still 69 through a pipe 79 to a sump or settling tank 80, in which calcium salts, lime, and other suspended matter settle out. The waste is then allowed to flow through a pipe 81 by means of which non-phenolic plant wastes are discharged from the plant.

The dephenolizer 66 may be of any suitable type, and may remove tar acids from the ammonia liquor at any point in the system between its condensation from the gas and its discharge as still waste. However, in the present instance the well-known Koppers vapor-recirculation process is used, and this is most conveniently operated at the point specified above; that is, after free ammonia has been removed from the liquor in the still 64.

The liquor entering one section of the dephenolizer 66, which comprises a plurality of sections through which steam or other suitable vapor is circulated by a blower 73, is brought into intimate contact with the circulating vapor.

Phenols or other tar acids are thereby very completely removed from the liquor, and the dephenolized liquor is returned to the still through the line 67, as described hereinabove.

In the other section or sections of the dephenolizer 66, the circulating vapor is brought into contact with a suitable alkaline material such as caustic soda solution, which reacts with the tar acids contained in the vapor to remove them from the vapor and to convert the caustic solution to a solution of tar acid salts, such as sodium phenolate. This solution is withdrawn from the dephenolizer 66 through a pipe 75 to a sodium phenolate tank 76, from which it may be withdrawn for recovery of the tar acids or other disposal as desired.

The gas flowing through the pipe 17, and the vapors entering the pipe 17 from the pipe 71, may both contain a certain amount of tar acid, which amount is usually small. In the saturator 20, a portion of this tar acid may be condensed from the gas under suitable temperature conditions, but in general, tar acid removal in the saturator is not complete. Part of the tar acids remaining in the gas after passing through the saturator 20 are removed in the final cooler 23, and the final cooler water is thus contaminated with phenol and its homologues. The disposal problem thus presented is minimized according to my invention by recirculating the cooling water and using it over again. Condensate from the gas tends to increase the volume of water so recirculated, but this tendency is counteracted by evaporation in the cooling tower, so that no excess occurs except in cold weather.

The gas passes through the pipe 22 and into the bottom of the final cooler 23 and upwardly therethrough and is brought into intimate contact with a countercurrent of cool water, which reduces the temperature of the gas and condenses water, tar acids, and other constituents therefrom. The condensate flows with the circulating water from the bottom of the final cooler 23 into a sump 85 from which it is withdrawn by a pump 86 and pumped over a cooling tower 87, or other suitable means of cooling.

While passing down over the cooling tower 87, the water is cooled by air delivered to a lower part of the tower 87 by a blower or blowers 88. This air causes evaporation of a portion of the water and thereby reduces the temperature of the remainder.

Cooled water flows from the bottom of the cooling tower 87 into a sump 89, from which it is withdrawn by a pump 90 and delivered through a pipe 91 to the top of the final cooler 23. It then passes downwardly through the cooler 23, cooling the gas with which it comes in contact, and is discharged with the condensate from the gas to be cooled and recirculated as described hereinabove.

Surplus cooling water, such as may be caused by an excess of condensation over evaporation in cold weather, overflows from the sump 89 through a contaminated water line 93 into a contaminated water reservoir 95, for disposal as described hereinbelow.

The gas, after leaving the final cooler 23, still contains at least traces of tar acids, which are sufficient to contaminate the light oils subsequently removed. The benzol and other light oils are removed from the gas in one or more stages or scrubbers. In the present instance, two scrubbers are used, 25 and 30. The gas is treated with a countercurrent of wash oil in the first scrubber 25, where a portion of the light oils is removed, then passes through pipe 29 to scrubber 30 where a further quantity of light oils is removed.

The benzolized or enriched wash oil containing light oils removed from the gas is withdrawn from the scrubber 25 by a pump 96 and delivered through a pipe 97, a vapor-to-oil heat exchanger 98, a pipe 99, an oil-to-oil heat exchanger 100, a pipe 101, a final heater 103 and a pipe 104 to a stripping still, or wash oil still 105.

In the still 105, the enriched wash oil is at least partially debenzolized, as by distillation with direct steam. Vapors consisting mainly of light oil and usually containing some steam pass from the still 105 through a pipe 107 to the vapor-to-oil heat exchanger 98, where they are partially cooled by the incoming benzolized wash oil. The vapors then continue through a pipe 108 to a light-oil cooler 109, where cooling and condensation are completed, then through a pipe 111 to a light-oil storage tank 112.

Aqueous condensate may be separated from the condensed light oil in a suitable decanter, or in the storage tank 112. In the present instance, the water, which may contain some tar acids removed from the gas with the light oil, is withdrawn from the bottom of the tank 112 through a pipe 113 to the contaminated water line 93.

The at least partially debenzolized wash oil is discharged from the still 105 through a pipe 114 to the oil-to-oil heat exchanger 100, where it is cooled by the incoming benzolized oil. The debenzolized oil continues through a pipe 116 to a decanter 117, in which the oil is separated from the condensed steam. The oil then flows through a pipe 119 to a wash-oil storage tank 120.

Debenzolized wash oil is withdrawn from the tank 120 by a pump 121 and delivered through a wash-oil cooler 122 and a pipe 123 to the top of the light oil scrubber 30. The wash oil flows down through the scrubber 30, absorbing light oil and sometimes other constituents from the countercurrent flow of gas, and is discharged from the bottom of the scrubber 30. It is then delivered by a pump 124 to the top of the scrubber 25. The oil passes downwardly through the scrubber 25, absorbing light oils, etc., from the gas, and is withdrawn from the bottom to be debenzolized and recirculated as described hereinabove.

Water from the wash oil decanter 117 flows through a pipe 126 and the contaminated water line 93 to the contaminated water reservoir or tank 95. Other plant waste waters contaminated with phenol or other tar acids, when such wastes occur, may also be discharged into the contaminated water reservoir 95 for disposal as described hereinbelow.

Hot coke is pushed from the several ovens which make up the battery 1 into a coke-quenching car 125, which is then moved to a quenching station 126, wherein the hot coke is cooled or quenched by spraying with water.

The quenching car 125 is stopped under or in range of sprays 130 in the quenching station 126, and cooling or quenching is started with contaminated water from the reservoir 95, which is delivered by a pump 127 through a pipe 128 and sprays 130 onto the hot coke in the quenching car 125. This contaminated water is completely evaporated by the hot coke.

The pump 127 is then stopped, and quenching is completed with water from a tank 132, which flows through pipes 133 and 128 and the sprays 130 onto the hot coke. When the temperature of the coke has been reduced to the point desired, the water supply is shut off, the quenching car 125 is moved out of the quenching station 126, and the coke is unloaded.

The tank 132 may be refilled with water pumped into the plant through a pipe 134, or if the pipe 134 carries water at a suitable pressure, the tank 132 may be eliminated and pipe 134 may be connected directly to pipe 133.

Since the contaminated water from the reservoir 95 is completely evaporated before completion of the quenching with ordinary water from the tank 132, the coke so quenched is uninjured and suitable for any purpose. The excess quenching water is uncontaminated with tar acid and may be disposed of as desired; for example, by discharging it through a pipe 135 into the pipe 81 through which other uncontaminated plant waste waters are discharged.

As an example of the applicability of this invention to plant practice, it is generally true that from 70 to 90 gallons of water are evaporated in coke quenching per ton of coal carbonized, and only about 10 gallons of contaminated water are produced in the light-oil recovery plant per ton of coal carbonized. The quantity of contaminated water from the final cooler is small, even in cold weather. Thus, in practice, the contaminated water is accordingly obtained in part from the final cooler 23, and in part by condensation in the light oil scrubbers 25 and 30 and in the light oil cooler 109, and in part from the decanter 117, and the quenching may be started with 10 to 15 gallons of contaminated water per ton of coke, which water is completely evaporated, and the quenching is then completed with an excess of fresh water.

Since the contaminated water to be disposed of by evaporation according to my invention is not mixed with the liquor that ultimately results as still waste from the ammonia still but is separately handled so that the contaminated water employed in the quenching of the coke is at least substantially free from calcium chloride and other inorganic salts which it would contain were it mixed, as heretofore, with the gas liquor in the hot drain tank 7. Consequently deterioration of quenching station equipment due to spraying with this material is eliminated. Furthermore, the value of the coke is not impaired by deposits of ill-smelling or otherwise undesirable matter, and there are no tar-acid bearing plant effluents which are difficult of disposal due to the regulations prohibiting phenolic pollution of streams.

In the foregoing description, the application of my invention to the disposal of coke plant wastes has been described, but it is obvious that contaminated effluents from other types of gas plants can be disposed of in a similar manner.

It will be obvious to those skilled in the art that various modifications may be made in the several parts of my apparatus and in the several steps of my process without departing from the spirit of my invention, and it is intended that the claims shall cover such changes as may reasonably be included within the scope thereof.

I claim as my invention:

1. The process of quenching hot coke which comprises partially quenching the hot coke with water contaminated with tar acid, thereby at least substantially completely evaporating the contaminated water, and then completing the quenching of the coke with water substantially free from tar acid.

2. The process of quenching hot coke which comprises partially quenching the hot coke with water contaminated with tar acid but substantially free from calcium chloride, thereby substantially completely evaporating the contaminated water, and then completing the quenching of the coke with ordinary water substantially free from tar acid.

FREDERICK W. SPERR, Jr.